US011705752B1

(12) United States Patent
Tang

(10) Patent No.: US 11,705,752 B1
(45) Date of Patent: Jul. 18, 2023

(54) LOW-VOLTAGE DIRECT SUPPLY SYSTEM CAPABLE OF SWITCHING BETWEEN SOLAR ENERGY AND MAINS SUPPLY

(71) Applicant: Shenzhen JinDian Electronic Technology Co., Ltd., Shenzhen (CN)

(72) Inventor: Shifu Tang, Shenzhen (CN)

( * ) Notice: Subject to any disclaimer, the term of this patent is extended or adjusted under 35 U.S.C. 154(b) by 0 days.

(21) Appl. No.: 18/057,987

(22) Filed: Nov. 22, 2022

(30) Foreign Application Priority Data

Apr. 20, 2022 (CN) .......................... 202210416970.4

(51) Int. Cl.
*H02J 7/35* (2006.01)
*H02J 3/38* (2006.01)
*H02J 9/06* (2006.01)
*H02S 10/00* (2014.01)

(52) U.S. Cl.
CPC ............... *H02J 7/35* (2013.01); *H02J 3/381* (2013.01); *H02J 9/068* (2020.01); *H02S 10/00* (2013.01); *H02J 2300/24* (2020.01)

(58) Field of Classification Search
CPC ............ H02J 7/35; H02J 9/0068; H02S 10/00
See application file for complete search history.

(56) References Cited

FOREIGN PATENT DOCUMENTS

CN 103441566 A 12/2013

*Primary Examiner* — Adi Amrany
(74) *Attorney, Agent, or Firm* — Novoclaims Patent Services LLC; Mei Lin Wong

(57) ABSTRACT

A low-voltage direct supply system capable of switching between solar energy and mains supply comprises: a solar and stable-voltage energy storage branch system used for providing solar power supply and charging through multiple groups of extensible solar panels and an energy storage battery pack; a mains power supply stable-switching branch system used for quickly switching to mains power supply without shocks through a mains supply conversion module and charging the energy storage battery pack; a power supply load detection and control branch system used for detecting a voltage, a charge/discharge current, and a balance between supply and demand of the energy storage battery pack and performing switching control on branch systems; and an output balance and low-voltage direct supply branch system used for performing balanced low-voltage direct supply on a load side according to a control output signal of the power supply load detection and control branch system.

8 Claims, 3 Drawing Sheets

LOW-VOLTAGE DIRECT SUPPLY SYSTEM CAPABLE OF SWITCHING BETWEEN SOLAR ENERGY AND MAINS SUPPLY

CROSS REFERENCE OF RELATED APPLICATION

This is a non-provisional application which claimed priority of Chinese application number 202210416970.4, filing date 04/20/2022. The contents of these specifications are incorporated herein by reference.

BACKGROUND OF THE PRESENT INVENTION

The invention relates to the technical field of new energy and new power supply, in particular to a low-voltage direct supply system capable of switching between solar energy and mains supply.

DESCRIPTION OF RELATED ARTS

At the present stage, existing solar power supply technologies typically invert the voltage of stored energy into a mains voltage. Household appliances often convert the mains voltage into a low voltage during work, wherein some realize voltage conversion through an external power supply such as mobile phones and LED lamps, and some realize voltage conversion through an internal conversion device such as televisions and desktop computers. The voltage of solar energy storage batteries is generally lower than the 36V safety voltage, and with the increase of the voltage of the solar energy storage batteries, the cost of a BMS protection circuit will be higher, and the risk will be higher. So, it is necessary to provide a low-voltage direct supply system capable of switching between solar energy and mains supply to solve at least part of the problems in the prior art.

SUMMARY OF THE PRESENT INVENTION

In the brief summary of the invention, a series of simplified concepts are introduced, which will be explained in detail in the detailed description of the invention. The contents in the brief summary of the invention are not intended to limit key features and essential technical features of the technical solutions to be protected by the invention, and are not intended to determine the protection scope of the technical solutions to be protected, either.

To solve at least part of the aforementioned problems, the invention provides a low-voltage direct supply system capable of switching between solar energy and mains supply, comprising:

A solar and stable-voltage energy storage branch system used for providing solar power supply and charging through multiple groups of extensible solar panels and an energy storage battery pack;

A mains power supply stable-switching branch system used for quickly switching to mains power supply without shocks through a mains supply conversion module and charging the energy storage battery pack;

A power supply load detection and control branch system used for detecting a voltage, a charge/discharge current, and a balance between supply and demand of the energy storage battery pack and performing switching control on branch systems; and An output balance and low-voltage direct supply branch system used for performing balanced low-voltage direct supply on a load side according to a control output signal of the power supply load detection and control branch system.

Preferably, the solar and stable-voltage energy storage branch system comprises:

An extensible solar panel sub-system used for performing variable solar power supply through the multiple groups of extensible solar panels;

An energy storage battery pack allocation sub-system used for storing surplus electric energy through a centralized energy storage battery pack when photoelectric power is sufficient, and supplying power to a load when the photoelectric power is insufficient; and A charge/discharge connecting and switching sub-system used for connecting the solar panels and the energy storage battery pack and switching between charging and discharging.

Preferably, the mains power supply stable-switching branch system comprises:

A mains supply switching start sub-system used for triggering a solar energy-to-mains supply start signal when photoelectric power is insufficient and electricity in energy storage batteries is consumed to a set minimum value;

A mains supply stable-switching sub-system used for quickly and stably switching to mains power supply when receiving the solar energy-to-mains supply start signal from the mains supply switching start sub-system; and A mains power supply and charging sub-system used for supplying power and charging the energy storage batteries through a mains supply when the mains supply stable-switching sub-system switches to the mains power supply.

Preferably, the power supply load detection and control branch system comprises:

A photo-electricity and energy storage detection and control sub-system used for detecting the voltage, the charge/discharge current, and the balance between supply and demand of the energy storage battery pack through voltage detection, current detection and power supply load balance detection;

A mains supply port input-output sub-system used for being externally connected to a mains supply and externally connected to an output switch through a mains supply module input port; and A main control chip operation control sub-system used for performing output photoelectric control, charge/discharge control, parameter calculation and battery capacity calculation, and controlling over-current protection start-stop, mains supply module start-stop, or output switch on-off.

Preferably, the output balance and low-voltage direct supply branch system comprises:

An output load detection sub-system used for detecting load characteristics of an output load to obtain a load characteristic detection result;

A load balance regulation sub-system used for regulating load power supply through a balance regulation module according to the load characteristic detection result to obtain load balance demand parameters; and A load low-voltage direct supply sub-system used for connecting the extensible solar panels in parallel or in series to form a solar panel array according to the load balance demand parameters of a solar power supply low-voltage safety system, and controlling an output balance to perform low-voltage direct supply on the load side.

Preferably, the photo-electricity and energy storage detection and control sub-system comprises:

A photo-electricity and energy storage pack detection branch system used for detecting the solar panels, as well as the voltage and charge/discharge current of the batteries to obtain photo-electricity and energy storage pack detection data;

A photoelectric charging circuit control branch system used for controlling a photoelectric charging circuit according to the photo-electricity and energy storage pack detection data; and A solar panel control branch system used for controlling extension and series/parallel connection of the solar panels according to a control signal.

Preferably, the main control chip operation control sub-system comprises:

A main control logic operation branch system used for outputting photoelectric control logic, charge/discharge control logic, parameter calculation and battery capacity calculation to obtain main control logic operation information;

A main control chip control branch system used for performing main control system control during a solar energy and mains supply switching process and a stable power supply process according to the main control logic operation information to obtain a main control system control signal; and A main control system execution branch system used for executing load side protection, energy storage battery protection, circuit device protection, mains supply module start-stop and output switch control according to the main control system control signal, and performing power regulation, communication and protection through the main controller, which specifically comprises: over-charge protection implemented by limiting a charge voltage to stop charging when it is detected that the voltage of the energy storage battery pack reaches a charging cut-off voltage, over-discharge protection implemented by automatically stopping an output by the main controller to protect the energy storage battery pack against damage when the voltage of the energy storage battery pack is lower than a protection voltage and automatically resuming power supply when the energy storage battery pack is recharged, and load over-current and short-circuit protection implemented by automatically cutting off a load output by the main controller when a load current exceeds a rated current of the main controller or the load is short-circuited; the main controller is used for over-voltage protection control, reverse charge protection control, and lightning protection control; power of the main controller is selected according to power of a total load withstood by the system, and the rated current of the main controller determines a maximum operating current of the load; a port of the main controller comprises wires connected to the following components: a set of positive and negative wires connected to the solar panels, a set of positive and negative wires connected to the energy storage battery pack, and a set of positive and negative wires connected to the load output; an operating voltage of a low-voltage controller of the system is 12V or 24V; the main controller is also used for determining whether it is daytime or nighttime according to the intensity of a charging current, and performing automatic charging in daytime and automatic discharging in nighttime to automatically turn on a lamp in nighttime and turn off the lamp in daytime; the voltage of the energy storage battery pack is detected through a voltage analog detection module; and the voltage analog detection module comprises: an energy storage battery pack analog output terminal, a voltage detection unit, a PWB modulation circuit, an analog load and an adjustable load circuit, and the adjustable load circuit is electrically connected to the energy storage battery pack analog output terminal; a current of the adjustable load circuit is in direct proportion to an output current of the PWB modulation circuit; an output voltage of the PWB modulation circuit is in direct proportion to a voltage of the energy storage battery pack analog output terminal; the output switch is disposed on a circuit between the PWB modulation circuit and the voltage detection unit, a movable contact of the output switch is electrically connected to an output voltage external control signal terminal of the PWB modulation circuit, and one static contact of the output switch is electrically connected to the voltage detection unit; and the voltage of the energy storage battery pack is reflected by a detection result of the voltage detection unit.

Preferably, the output load detection sub-system comprises:

A load characteristic detection branch system used for obtaining, by calculation, load characteristic power supply parameters of the output load through load characteristic power supply parameter detection;

A power supply parameter transmission branch system used for transmitting the load characteristic power supply parameters to an MCU on the load side; and A characteristic detection feedback branch system used for triggering a load start-stop signal and a load output power signal through the MCU on the load side, feeding a power supply demand signal back to the load balance regulation sub-system, and obtaining a load characteristic detection result.

Preferably, the load balance regulation sub-system comprises:

A feedback receiving and converting branch system used for receiving the load characteristic detection result of the output load detection sub-system and converting the load characteristic detection result into a regulation signal;

A balance regulation start branch system used for starting the balance regulation module according to the regulation signal; and A demand parameter regulation branch system used for regulating load power supply through the balance regulation module, outputting regulation demand parameters, and obtaining the load balance demand parameters.

Preferably, the load low-voltage direct supply sub-system comprises:

A demand main-control feedback branch system used for feeding the load balance demand parameters of the solar power supply low-voltage safety system back to a main control chip, wherein when solar power is supplied for low-voltage safety lighting, a current generated by the solar panels enters a main controller and then charges the energy storage battery pack during charging, and a current from the energy storage battery pack enters the main controller and then discharges to the load during discharging; electric energy converted from the solar energy charges the energy storage battery pack through the main controller and is stored; the multiple groups of solar panels are connected in parallel or in series to form the solar panel array according to an overall power demand of the system;

A photoelectric array control branch system used for connecting the extensible solar panels in parallel or in series to form the solar panel array through the main control chip, wherein each of the extensible solar panels comprises squamous photovoltaic sheets, an extensible photovoltaic sheet attachment surface, an extensible surface outspread net and a light-sensitive outspread net control structure, the squamous photovoltaic sheets are attached to an upper side of the extensible photovoltaic sheet attachment surface, a lower side of the extensible photovoltaic sheet attachment surface is attached to the extensible surface outspread net, the light-sensitive outspread net control structure senses a light intensity to control a mesh diameter of the extensible surface outspread net so as to control the extensible photovoltaic sheet attachment surface to expand or contract to change an overlap degree and acceptance angle of illuminated layers of the squamous photovoltaic sheets; when the light intensity is high and the energy storage battery pack is fully charged, the electric energy converted from the solar energy is greater than a set low-voltage direct supply maximum peak of a set low-voltage direct supply peak range, the light-sensitive outspread net control structure senses that the light intensity is too high and controls the mesh diameter of the extensible surface outspread net to become smaller, so as to control the extensible photovoltaic sheet attachment surface to contract, the overlap degree of the illuminated layers of the squamous photovoltaic sheets attached to the extensible photovoltaic sheet attachment surface is increased, an illuminated surface is shrunk, the acceptance angle is decreased, and solar energy-to-electric energy conversion efficiency is reduced until the electric energy converted from the solar energy is not greater than the set low-voltage direct supply maximum peak and is within the set low-voltage direct supply peak range; when the light intensity is low, the electric energy converted from solar energy is lower than a set low-voltage direct supply minimum peak of the set low-voltage direct supply peak range, the light-sensitive outspread net control structure senses that the light intensity is too low and controls the mesh diameter of the extensible surface outspread net to become larger, so as to control the extensible photovoltaic sheet attachment surface to expand, the overlap degree of the illuminated layers of the squamous photovoltaic sheets attached to the extensible photovoltaic sheet attachment surface is decreased, the illuminated surface is enlarged, the acceptance angle is increased, and the solar energy-to-electric energy conversion efficiency is improved until the electric energy converted from the solar energy is not lower than the set low-voltage direct supply minimum peak and is within the set low-voltage direct supply peak range; and A balanced low-voltage direct supply branch system used for controlling an output balance and driving circuit to perform low-voltage direct supply on the load side, wherein the energy storage battery pack has over-charge protection, the voltage and current of the energy storage battery pack, series or parallel connection of batteries, and a matching operating voltage and current of the main controller are determined according to a voltage and current of the system, and power of the solar panels, total power of the load, an expected lighting time, an expected battery life, and a local average sunlight intensity and duration determine an electric capacity of the energy storage battery pack.

Compared with the prior art, the invention has at least the following beneficial effects:

According to the low-voltage direct supply system capable of switching between solar energy and mains supply, multiple groups of extensible solar panels and the energy storage battery pack are used to provide solar energy for power supply and charging; the system can be quickly switched to mains power supply without shocks through the mains supply conversion module, and the energy storage pack can be charged; the voltage, the charge/discharge current, and the balance between supply and demand of the energy storage battery pack are detected, and switching control is performed on all branch systems; balanced low-voltage direct supply is performed on the load side according to a control output signal of the power supply load detection and control branch system; the multiple groups of extensible solar panels perform variable solar power supply; surplus electric energy will be stored when photoelectric power is sufficient, and power is supplied to the load when the photoelectric power is insufficient; when the photoelectric power is insufficient and the electricity in the energy storage batteries is consumed a set minimum value, the system is quickly and stably switched to mains power supply, and the energy storage batteries are charged at the same time; the voltage, the charge/discharge current, and the balance between supply and demand of the energy storage batteries can be detected; output photoelectric control, charge/discharge control, parameter calculation, and battery capacity calculation can be performed, and over-current protection start-stop, mains supply module start-stop, or output switch on-off can be controlled; load power supply can be regulated, the extensible solar panels can be connected in parallel or in series to form the solar panel array according to the load balance demand parameters of the solar power supply low-voltage safety system, and the output balance is controlled to perform low-voltage direct supply on the load side, in this technical solution, the low-voltage direct supply system adopts both solar power supply and mains power supply; by the adoption of solar low-voltage direct supply, a low voltage system does not need to be inverted into the mains voltage anymore, and the situation that, in the prior art, the voltage of stored energy needs to be inverted into the mains voltage is changed; the voltage of the solar energy storage batteries is lower than the 36V safety voltage, so the problems of high BMS protection circuit cost and high risk of the low-voltage system caused by a high voltage are solved; the system is suitable for most household appliances which need to convert the mains voltage into a low voltage during work through an external power supply or an internal conversion device such as mobile phones, LED lamps, televisions and desktop computers; solar energy can be expanded to all new energy requiring electrochemical energy storage such as wind energy and tidal power generation, which can also be used in combination; the low-voltage direct supply system can discharge without increasing the voltage, thus being suitable for low-voltage direct supply load devices, high in effective power, and high in line safety; and the mains voltage is converted into a safety voltage corresponding to the energy storage batteries, power supply is switched when needed, and the efficiency of mains power supply will not be reduced.

Other advantages, purposes and features of the low-voltage direct supply system capable of switching between solar energy and mains supply of the invention will be partially reflected by the following description and partially understood by those skilled in the art in study and practice of the invention.

BRIEF DESCRIPTION OF THE DRAWINGS

The drawings aim to provide a further understanding of the invention, constitute part of the specification, and are used to explain the invention together with the embodiments of the invention, but they are not intended to limit the invention. In the drawings.

DETAILED DESCRIPTION OF THE PREFERRED EMBODIMENT

Figure 1:
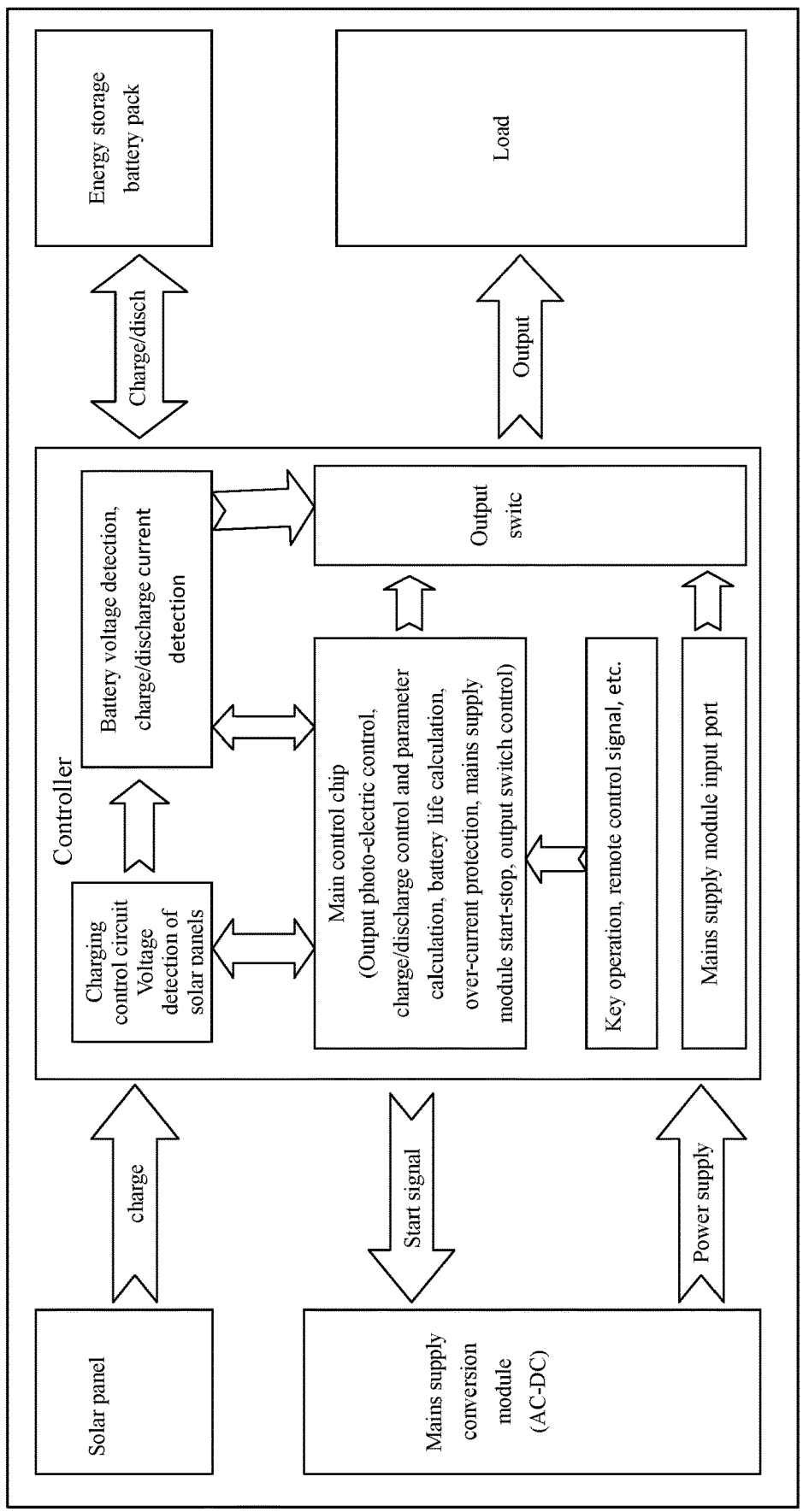
FIG. 1 is a block diagram of a low-voltage direct supply system capable of switching between solar power and mains supply according to the invention.
Figure 2:
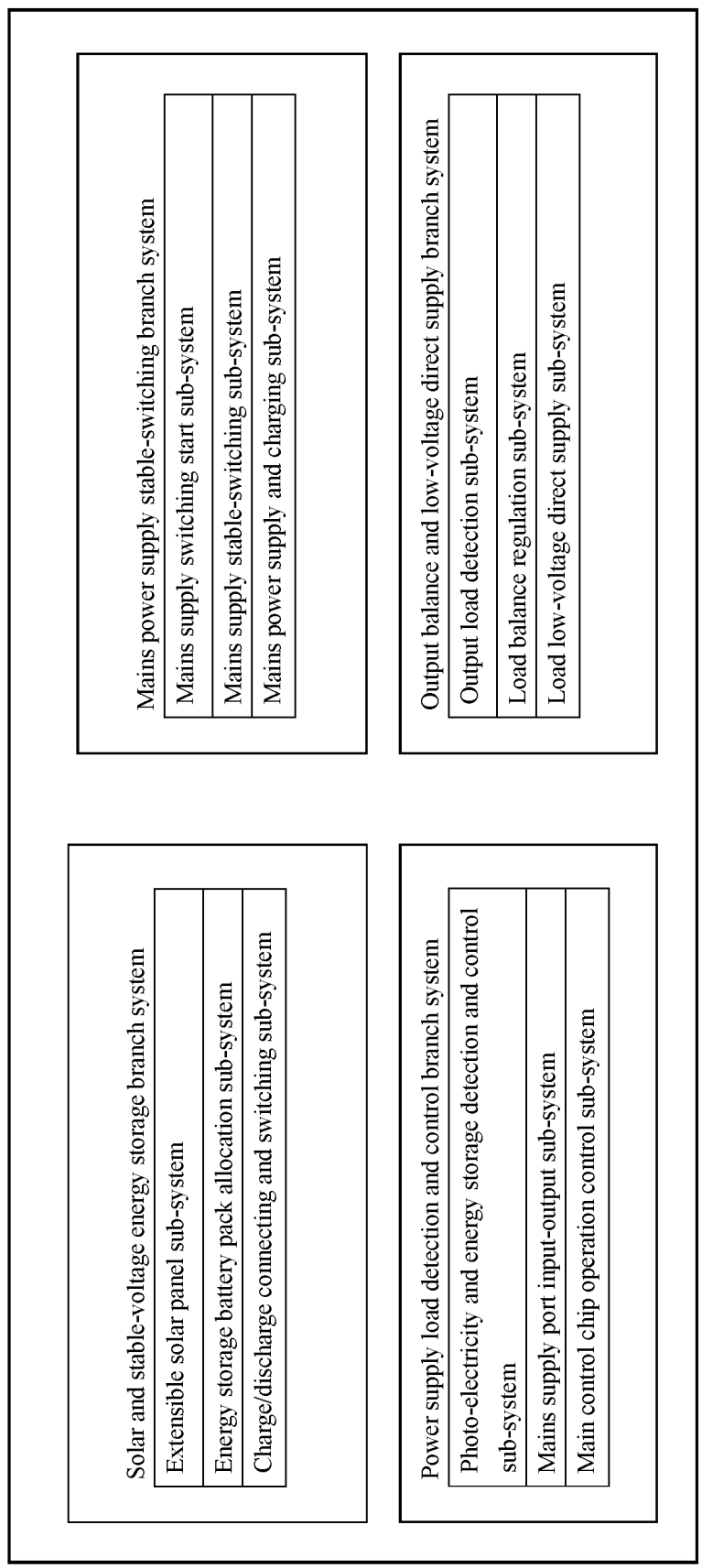
FIG. 2 is a diagram of branch systems of the low-voltage direct supply system capable of switching between solar power and mains supply according to the invention.
Figure 3:
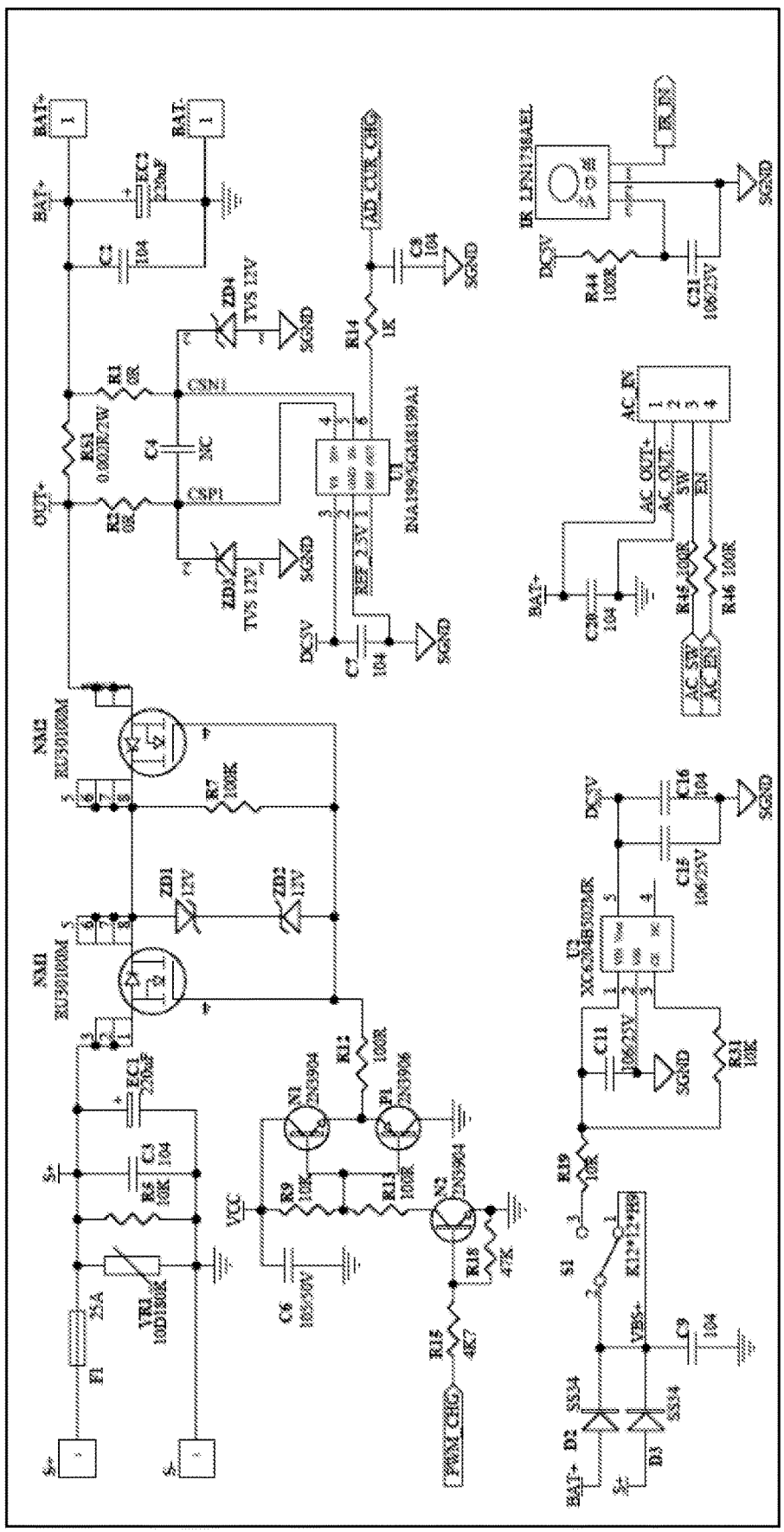
FIG. 3 is a diagram of a switching control circuit of the low-voltage direct supply system capable of switching between solar power and mains supply according to the invention.

The invention will be described in further detail below in conjunction with the accompanying drawings and embodiments to allow those skilled in the art to implement the invention with reference to the contents in the specification. As shown in FIG. 1-FIG. 3, the invention provides a low-voltage direct supply system capable of switching between solar power and main supply, comprising:

A solar and stable-voltage energy storage branch system used for providing solar power supply and charging through multiple groups of extensible solar panels and an energy storage battery pack;

A mains power supply stable-switching branch system used for quickly switching to mains power supply without shocks through a mains supply conversion module and charging the energy storage battery pack;

A power supply load detection and control branch system used for detecting a voltage, a charge/discharge current, and a balance between supply and demand of the energy storage battery pack and performing switching control on branch systems; and An output balance and low-voltage direct supply branch system used for performing balanced low-voltage direct supply on a load side according to a control output signal of the power supply load detection and control branch system.

The operating principle of the this technical solution is as follows: the low-voltage direct supply system capable of switching between solar power and main supply comprises: the solar and stable-voltage energy storage branch system used for providing solar power supply and charging through multiple groups of extensible solar panels and the energy storage battery pack; the mains power supply stable-switching branch system used for quickly switching to mains power supply without shocks through the mains supply conversion module and charging the energy storage battery pack; the power supply load detection and control branch system used for detecting the voltage, the charge/discharge current, and the balance between supply and demand of the energy storage battery pack and performing switching control on branch systems; and the output balance and low-voltage direct supply branch system used for performing balanced low-voltage direct supply on the load side according to the control output signal of the power supply load detection and control branch system. In this technical solution, the low-voltage direct supply system adopts both solar power supply and mains power supply, the solar power supply is preferential, and when solar energy is about to be exhausted or a certain amount of solar power is left, the system will be automatically switched to mains power supply; and the system is mainly featured by low-voltage power supply, the voltage of stored energy does not need to be inverted into a mains voltage. Most household appliances need to convert the mains voltage into a low voltage during work, wherein some realize voltage conversion through an external power supply such as mobile phones and LED lamps, and some realize voltage conversion through an internal conversion device such as televisions and desktop computers. The voltage of solar energy storage batteries is less than the 36V safety voltage, and solar energy can be expanded to all new energy requiring electrochemical energy storage such as wind energy and tidal power generation, which can also be used in combination. On the other hand, with the increase of the voltage, the cost of a BMS protection circuit will be higher, and the risk will be higher. While, the low-voltage direct supply system provided by the invention can discharge without increasing the voltage, thus being suitable for load equipment of low-voltage direct supply electrical products.

This technical solution has the following beneficial effects: the low-voltage direct supply system capable of switching between solar power and main supply provides solar power supply and charging through multiple groups of extensible solar panels and the energy storage battery pack, quickly switches to mains power supply without shocks through the mains supply conversion module and charges the energy storage battery pack, detects the voltage, the charge/discharge current, and the balance between supply and demand of the energy storage battery pack and performs switching control on the branch systems, and performs balanced low-voltage direct supply on the load side according to the control output signal of the power supply load detection and control branch system; the multiple groups of extensible solar panels perform variable solar power supply; surplus electric energy will be stored when the photoelectric power is sufficient, and power is supplied to a load when the photoelectric power is insufficient; when the photoelectric power is insufficient and the electricity in energy storage batteries is consumed a set minimum value, the system is quickly and stably switched to mains power supply, and the energy storage batteries are charged at the same time; the voltage, the charge/discharge current, and the balance between supply and demand of the energy storage batteries can be detected; output photoelectric control, charge/discharge control, parameter calculation, and battery capacity calculation can be performed, and over-current protection start-stop, mains supply module start-stop, or output switch on-off can be controlled; load power supply can be regulated, the extensible solar panels can be connected in parallel or in series to form a solar panel array according to load balance demand parameters of a solar power supply low-voltage safety system, and the output balance is controlled to perform low-voltage direct supply on the load side. In this technical solution, the low-voltage direct supply system adopts both solar power supply and mains power supply; by the adoption of solar low-voltage direct supply, a low voltage system does not need to be inverted into the mains voltage anymore, and the situation that, in the prior art, the voltage of stored energy needs to be inverted into the mains voltage is changed; the voltage of the solar energy storage batteries is lower than the 36V safety voltage, so the problems of high BMS protection circuit cost and high risk of the low-voltage system caused by a high voltage are solved; the system is suitable for most household appliances which need to convert the mains voltage into a low voltage during work through an external power supply or an internal conversion device such as mobile phones, LED lamps, televisions and desktop computers; solar energy can be expanded to all new energy requiring electrochemical energy storage such as wind energy and tidal power generation, which can also be used in combination; the low-voltage direct supply system can discharge without increasing the voltage, thus being suitable for low-voltage direct supply load devices, high in effective power, and high in line safety; and the mains voltage is converted into a safety voltage corresponding to the energy storage batteries, power supply is switched when needed, and the efficiency of mains power supply will not be reduced.

In one embodiment, the solar and stable-voltage energy storage branch system comprises:

An extensible solar panel sub-system used for performing variable solar power supply through multiple groups of extensible solar panels;

An energy storage battery pack allocation sub-system used for storing surplus electric energy through a centralized energy storage battery pack when photoelectric power is sufficient, and supplying power to a load when the photoelectric power is insufficient; and A charge/discharge connecting and switching sub-system used for connecting the solar panels and the energy storage battery pack and switching between charging and discharging.

The operating principle of this technical solution is as follows: the solar and stable-voltage energy storage branch system comprises: the extensible solar panel sub-system used for performing variable solar power supply through multiple groups of extensible solar panels; the energy storage battery pack allocation sub-system used for storing surplus electric energy through the centralized energy storage battery pack when the photoelectric power is sufficient, and supplying power to the load when the photoelectric power is insufficient; and the charge/discharge connecting and switching sub-system used for connecting the solar panels and the energy storage battery pack and switching between charging and discharging.

This technical solution has the following beneficial effects: the solar and stable-voltage energy storage branch system comprises: the extensible solar panel sub-system used for performing variable solar power supply through multiple groups of extensible solar panels; the energy storage battery pack allocation sub-system used for storing surplus electric energy through the centralized energy storage battery pack when the photoelectric power is sufficient, and supplying power to the load when the photoelectric power is insufficient; and the charge/discharge connecting and switching sub-system used for connecting the solar panels and the energy storage battery pack and switching between charging and discharging; the multiple groups of extensible solar panels are used for variable solar power supply; and surplus electric energy is stored when the photoelectric power is sufficient, and power is supplied to the load when the photoelectric power is insufficient.

In one embodiment, the mains power supply stable-switching branch system comprises:

A mains supply switching start sub-system used for triggering a solar energy-to-mains supply start signal when the photoelectric power is insufficient and the electricity in the energy storage batteries is consumed to the set minimum value;

A mains supply stable-switching sub-system used for quickly and stably switching to mains power supply when receiving the solar energy-to-mains supply start signal from the mains supply switching start sub-system; and A mains power supply and charging sub-system used for supplying power and charging the energy storage batteries through a mains supply when the mains supply stable-switching sub-system switches to the mains power supply.

The operating principle of this technical solution is as follows: the mains power supply stable-switching branch system comprises: the mains supply switching start sub-system used for triggering the solar energy-to-mains supply start signal when the photoelectric power is insufficient and the electricity in the energy storage batteries is consumed to the set minimum value; the mains supply stable-switching sub-system used for quickly and stably switching to mains power supply when receiving the solar energy-to-mains supply start signal from the mains supply switching start sub-system; and the mains power supply and charging sub-system used for supplying power and charging the energy storage batteries through the mains supply when the mains supply stable-switching sub-system switches to the mains power supply.

This technical solution has the following beneficial effects: the mains power supply stable-switching branch system comprises: the mains supply switching start sub-system used for triggering the solar energy-to-mains supply start signal when the photoelectric power is insufficient and the electricity in the energy storage batteries is consumed to the set minimum value; the mains supply stable-switching sub-system used for quickly and stably switching to mains power supply when receiving the solar energy-to-mains supply start signal from the mains supply switching start sub-system; and the mains power supply and charging sub-system used for supplying power and charging the energy storage batteries through the mains supply when the mains supply stable-switching sub-system switches to the mains power supply; the system is quickly and stably switched to mains power supply when the photoelectric power is insufficient and the electricity in the energy storage batteries is consumed to the set minimum value; and the energy storage batteries can be charged at the same time.

In one embodiment, the power supply load detection and control branch system comprises:

A photo-electricity and energy storage detection and control sub-system used for detecting the voltage, the charge/discharge current, and the balance between supply and demand of the energy storage battery pack through voltage detection, current detection and power supply load balance detection;

A mains supply port input-output sub-system used for being externally connected to a mains supply and externally connected to an output switch through a mains supply module input port; and A main control chip operation control sub-system used for performing output photoelectric control, charge/discharge control, parameter calculation and battery capacity calculation, and controlling over-current protection start-stop, mains supply module start-stop, or output switch on-off.

The operating principle of this technical solution is as follows: the power supply load detection and control branch system comprises: the photo-electricity and energy storage detection and control sub-system used for detecting the voltage, the charge/discharge current, and the balance between supply and demand of the energy storage battery pack through voltage detection, current detection, and power supply load balance detection; the mains supply port input-output sub-system used for being externally connected to the mains supply and externally connected to the output switch through the mains supply module input port; and the main control chip operation control sub-system used for performing output photoelectric control, charge-discharge control, parameter calculation and battery capacity calculation, and controlling over-current protection start-stop, mains supply module start-stop, or output switch on-off.

This technical solution has the following beneficial effects: the power supply load detection and control branch system comprises: the photo-electricity and energy storage detection and control sub-system used for detecting the voltage, the charge/discharge current, and the balance between supply and demand of the energy storage battery pack through voltage detection, current detection, and power supply load balance detection; the mains supply port input-output sub-system used for being externally connected to the mains supply and externally connected to the output switch through the mains supply module input port; and the main control chip operation control sub-system used for performing output photoelectric control, charge-discharge control, parameter calculation and battery capacity calculation, and controlling over-current protection start-stop, mains supply module start-stop, or output switch on-off; both solar power supply and mains power supply are adoption, and by the adoption of solar low-voltage direct supply, a low voltage system does not need to be inverted into the mains voltage anymore, and the situation that, in the prior art, the voltage of stored energy needs to be inverted into the mains voltage is changed; and the voltage of the solar energy storage batteries is lower than the 36V safety voltage, so the problems of high BMS protection circuit cost and high risk of the low-voltage system caused by a high voltage are solved.

In one embodiment, the output balance and low-voltage direct supply branch system comprises:

An output load detection sub-system used for detecting load characteristics of an output load to obtain a load characteristic detection result;

A load balance regulation sub-system used for regulating load power supply through a balance regulation module according to the load characteristic detection result to obtain load balance demand parameters; and A load low-voltage direct supply sub-system used for connecting the extensible solar panels in parallel or in series to form a solar panel array according to the load balance demand parameters of a solar power supply low-voltage safety system, and controlling an output balance to perform low-voltage direct supply on the load side.

The operating principle of this technical solution is as follows: the output balance and low-voltage direct supply branch system comprises: the output load detection sub-system used for detecting load characteristics of the output load to obtain the load characteristic detection result; the load balance regulation sub-system used for regulating the load power supply through the balance regulation module according to the load characteristic detection result to obtain the load balance demand parameters; and the load low-voltage direct supply sub-system used for connecting the extensible solar panels in parallel or in series to form the solar panel array according to the load balance demand parameters of the solar power supply low-voltage safety system, and controlling the output balance to perform low-voltage direct supply on the load side.

This technical solution has the following beneficial effects: the output balance and low-voltage direct supply branch system comprises:

The output load detection sub-system used for detecting the load characteristics of the output load to obtain the load characteristic detection result;

The load balance regulation sub-system used for regulating the load power supply through the balance regulation module according to the load characteristic detection result to obtain the load balance demand parameters; and The load low-voltage direct supply sub-system used for connecting the extensible solar panels in parallel or in series to form the solar panel array according to the load balance demand parameters of the solar power supply low-voltage safety system, and controlling the output balance to perform low-voltage direct supply on the load side; the requirements of most household appliances needing to convert mains voltage into low voltage during work through an external power supply or an internal conversion device such as mobile phones, LED lamps, televisions and desktop computers are met; the system is suitable for most household appliances which need to convert the mains voltage into a low voltage during work through an external power supply or an internal conversion device such as mobile phones, LED lamps, televisions and desktop computers; the low-voltage direct supply system can discharge without increasing the voltage, thus being suitable for low-voltage direct supply load devices, high in effective power, and high in line safety; and the mains voltage is converted into a safety voltage corresponding to the energy storage batteries, power supply is switched when needed, and the efficiency of mains power supply will not be reduced.

In one embodiment, the photo-electricity and energy storage detection and control sub-system comprises:

A photo-electricity and energy storage pack detection branch system used for detecting the solar panels, as well as the voltage and charge/discharge current of the batteries to obtain photo-electricity and energy storage pack detection data;

A photoelectric charging circuit control branch system used for controlling a photoelectric charging circuit according to the photo-electricity and energy storage pack detection data; and A solar panel control branch system used for controlling extension and series/parallel connection of the solar panels according to a control signal.

The operating principle of this technical solution is as follows: the photo-electricity and energy storage detection and control sub-system comprises: the photo-electricity and energy storage pack detection branch system used for detecting the solar panels, as well as the voltage and charge/discharge current of the batteries to obtain photo-electricity and energy storage pack detection data; the photoelectric charging circuit control branch system used for controlling the photoelectric charging circuit according to the photo-electricity and energy storage pack detection data; and the solar panel control branch system used for controlling the extension and series/parallel connection of the solar panels according to the control signal.

This technical solution has the following beneficial effects: the photo-electricity and energy storage detection and control sub-system comprises: the photo-electricity and energy storage pack detection branch system used for detecting the solar panels, as well as the voltage and charge/discharge current of the batteries to obtain the photo-electricity and energy storage pack detection data; the photoelectric charging circuit control branch system used for controlling the photoelectric charging circuit according to the photo-electricity and energy storage pack detection data; and the solar panel control branch system used for controlling the extension and series/parallel connection of the solar panels according to the control signal; and load power supply can be regulated, and the extensible solar panels can be connected in parallel or in series to form the solar panel array according to the load balance demand parameters of the solar power supply low-voltage safety system.

In one embodiment, the main control chip operation control sub-system comprises:

A main control logic operation branch system used for outputting photoelectric control logic, charge/discharge control logic, parameter calculation and battery capacity calculation to obtain main control logic operation information;

A main control chip control branch system used for performing main control system control during a solar energy and mains supply switching process and a stable power supply process according to the main control logic operation information to obtain a main control system control signal; and A main control system execution branch system used for executing load side protection, energy storage battery protection, circuit device protection, mains supply module start-stop and output switch control according to the main control system control signal, and performing power regulation, communication and protection through a main controller, which specifically comprises: over-charge protection implemented by limiting the charge voltage to stop charging when it is detected that the voltage of the energy storage battery pack reaches a charging cut-off voltage, over-discharge protection implemented by automatically stopping an output by the main controller to protect the energy storage battery pack against damage when the voltage of the energy storage battery pack is lower than a protection voltage and automatically resuming power supply when the energy storage battery pack is recharged, and load over-current and short-circuit protection implemented by automatically cutting off a load output by the main controller when a load current exceeds a rated current of the main controller or a load is short-circuited; the main controller is used for over-voltage protection control, reverse charge protection control, and lightning protection control; the power of the main controller is selected according to the power of a total load withstood by the system, and the rated current of the main controller determines a maximum operating current of the load; a port of the main controller comprises wires connected to the following components: a set of positive and negative wires connected to the solar panels, a set of positive and negative wires connected to the energy storage battery pack, and a set of positive and negative wires connected to the load output; an operating voltage of a low-voltage controller of the system is 12V or 24V; the main controller is also used for determining whether it is daytime or nighttime according to the intensity of a charging current, and performing automatic charging in daytime and automatic discharging in nighttime to automatically turn on a lamp in nighttime and turn off the lamp in daytime; the voltage of the energy storage battery pack is detected through a voltage analog detection module; and the voltage analog detection module comprises: an energy storage battery pack analog output terminal, a voltage detection unit, a PWB modulation circuit, an analog load and an adjustable load circuit, and the adjustable load circuit is electrically connected to the energy storage battery pack analog output terminal; a current of the adjustable load circuit is in direct proportion to an output current of the PWB modulation circuit; an output voltage of the PWB modulation circuit is in direct proportion to a voltage of the energy storage battery pack analog output terminal; the output switch is disposed on a circuit between the PWB modulation circuit and the voltage detection unit, a movable contact of the output switch is electrically connected to an output voltage external control signal terminal of the PWB modulation circuit, and one static contact of the output switch is electrically connected to the voltage detection unit; and the voltage of the energy storage battery pack is reflected by a detection result of the voltage detection unit.

The operating principle of this technical solution is as follows: the main control chip operation control sub-system comprises: the main control logic operation branch system used for outputting photoelectric control logic, charge/discharge control logic, parameter calculation and battery capacity calculation to obtain main control logic operation information; the main control chip control branch system used for performing main control system control during the solar energy and mains supply switching process and the stable power supply process according to the main control logic operation information to obtain a main control system control signal; and the main control system execution branch system used for executing load side protection, energy storage battery protection, circuit device protection, mains supply module start-stop and output switch control according to the main control system control signal, and performing power regulation, communication and protection through the main controller, which specifically comprises: over-charge protection implemented by limiting the charge voltage to stop charging when it is detected that the voltage of the energy storage battery pack reaches the charging cut-off voltage, over-discharge protection implemented by automatically stopping the output by the main controller to protect the energy storage battery pack against damage when the voltage of the energy storage battery pack is lower than the protection voltage and automatically resuming power supply when the energy storage battery pack is recharged, and load over-current and short-circuit protection implemented by automatically cutting off the load output by the main controller when the load current exceeds the rated current of the main controller or the load is short-circuited; the main controller is used for over-voltage protection control, reverse charge protection control, and lightning protection control; the power of the main controller is selected according to the power of the total load withstood by the system, and the rated current of the main controller determines the maximum operating current of the load; the port of the main controller comprises wires connected to the following components: a set of positive and negative wires connected to the solar panels, a set of positive and negative wires connected to the energy storage battery pack, and a set of positive and negative wires connected to the load output; the operating voltage of the low-voltage controller of the system is 12V or 24V; the main controller is also used for determining whether it is daytime or nighttime according to the intensity of a charging current, and performing automatic charging in daytime and automatic discharging in nighttime to automatically turn on a lamp in nighttime and turn off the lamp in daytime; the voltage of the energy storage battery pack is detected through the voltage analog detection module; and the voltage analog detection module comprises: the energy storage battery pack analog output terminal, the voltage detection unit, the PWB modulation circuit, the analog load and the adjustable load circuit, and the adjustable load circuit is electrically connected to the energy storage battery pack analog output terminal; the current of the adjustable load circuit is in direct proportion to the output current of the PWB modulation circuit; the output voltage of the PWB modulation circuit is in direct proportion to the voltage of the energy storage battery pack analog output terminal; the output switch is disposed on the circuit between the PWB modulation circuit and the voltage detection unit, the movable contact of the output switch is electrically connected to the output voltage external control signal terminal of the PWB modulation circuit, and one static contact of the output switch is electrically connected to the voltage detection unit; and the voltage of the energy storage battery pack is reflected by a detection result of the voltage detection unit.

This technical solution has the following beneficial effects: the main control chip operation control sub-system comprises: the main control logic operation branch system used for outputting photoelectric control logic, charge/discharge control logic, parameter calculation and battery capacity calculation to obtain main control logic operation information; the main control chip control branch system used for performing main control system control during the solar energy and mains supply switching process and the stable power supply process according to the main control logic operation information to obtain a main control system control signal; and the main control system execution branch system used for executing load side protection, energy storage battery protection, circuit device protection, mains supply module start-stop and output switch control according to the main control system control signal, and performing power regulation, communication and protection through the main controller, which specifically comprises: over-charge protection implemented by limiting the charge voltage to stop charging when it is detected that the voltage of the energy storage battery pack reaches the charging cut-off voltage, over-discharge protection implemented by automatically stopping the output by the main controller to protect the energy storage battery pack against damage when the voltage of the energy storage battery pack is lower than the protection voltage and automatically resuming power supply when the energy storage battery pack is recharged, and load over-current and short-circuit protection implemented by automatically cutting off the load output by the main controller when the load current exceeds the rated current of the main controller or the load is short-circuited; the main controller is used for over-voltage protection control, reverse charge protection control, and lightning protection control; the power of the main controller is selected according to the power of the total load withstood by the system, and the rated current of the main controller determines the maximum operating current of the load; the port of the main controller comprises wires connected to the following components: a set of positive and negative wires connected to the solar panels, a set of positive and negative wires connected to the energy storage battery pack, and a set of positive and negative wires connected to the load output; the operating voltage of the low-voltage controller of the system is 12V or 24V; the main controller is also used for determining whether it is daytime or nighttime according to the intensity of a charging current, and performing automatic charging in daytime and automatic discharging in nighttime to automatically turn on a lamp in nighttime and turn off the lamp in daytime; the voltage of the energy storage battery pack is detected through the voltage analog detection module; and the voltage analog detection module comprises: the energy storage battery pack analog output terminal, the voltage detection unit, the PWB modulation circuit, the analog load and the adjustable load circuit, and the adjustable load circuit is electrically connected to the energy storage battery pack analog output terminal; the current of the adjustable load circuit is in direct proportion to the output current of the PWB modulation circuit; the output voltage of the PWB modulation circuit is in direct proportion to the voltage of the energy storage battery pack analog output terminal; the output switch is disposed on the circuit between the PWB modulation circuit and the voltage detection unit, the movable contact of the output switch is electrically connected to the output voltage external control signal terminal of the PWB modulation circuit, and one static contact of the output switch is electrically connected to the voltage detection unit; the voltage of the energy storage battery pack is reflected by a detection result of the voltage detection unit; output photoelectric control, charge/discharge control, parameter calculation and battery capacity calculation can be performed, and over-current protection start-stop, mains supply module start-stop or output switch on-off can be controlled.

In one embodiment, the output load detection sub-system comprises:

A load characteristic detection branch system used for obtaining, by calculation, load characteristic power supply parameters of the output load through load characteristic power supply parameter detection;

A power supply parameter transmission branch system used for transmitting the load characteristic power supply parameters to an MCU on the load side; and A characteristic detection feedback branch system used for triggering a load start-stop signal and a load output power signal through the MCU on the load side, feeding a power supply demand signal back to the load balance regulation sub-system, and obtaining a load characteristic detection result, wherein the load characteristic power supply parameters at time t are calculated by:

$$\begin{cases} Izft = \dfrac{2Udf*Ce}{\sqrt{4LsCe-(ReCe)^2}} \exp\left\{\dfrac{-Re}{2Ls}t\right\} \sin\dfrac{\sqrt{4LsCe-(ReCe)^2}}{2LsCe} \\ Uzft = -Udf* \\ \exp\left\{\dfrac{-Re}{2Ls}t\right\}\left(\dfrac{-ReCe}{\sqrt{4LsCe-(ReCe)^2}}\sin\dfrac{\sqrt{4LsCe-(ReCe)^2}}{2LsCe}t + \right. \\ \left. \cos\dfrac{\sqrt{4LsCe-(ReCe)^2}}{2LsCe}t + E \right) \end{cases}$$

Where, Izft is a load-side equivalent current in the load characteristic power supply parameters at time t, Uzft is a load-side equivalent voltage in the characteristic power supply parameters at time t, Udf is a peak voltage of a load equivalent capacitor, Ls is a circuit cascading equivalent inductance, Re is an equivalent resistance of the load, Ce is an equivalent capacitance of the load, E is a resonant voltage of a power supply switching load, and exp is an exponential form of a natural constant e as a base.

The operating principle of this technical solution is as follows: the output load detection sub-system comprises: the load characteristic detection branch system used for obtaining, by calculation, load characteristic power supply parameters of the output load through load characteristic power supply parameter detection;

The power supply parameter transmission branch system used for transmitting the load characteristic power supply parameters to an MCU on the load side; and the characteristic detection feedback branch system used for triggering a load start-stop signal and a load output power signal through the MCU on the load side, feeding a power supply demand signal back to the load balance regulation sub-system, and obtaining a load characteristic detection result, wherein the load characteristic power supply parameters at time t are calculated by:

$$\begin{cases} Izft = \dfrac{2Udf*Ce}{\sqrt{4LsCe-(ReCe)^2}} \exp\left\{\dfrac{-Re}{2Ls}t\right\} \sin\dfrac{\sqrt{4LsCe-(ReCe)^2}}{2LsCe} \\ Uzft = -Udf* \\ \exp\left\{\dfrac{-Re}{2Ls}t\right\}\left(\dfrac{-ReCe}{\sqrt{4LsCe-(ReCe)^2}}\sin\dfrac{\sqrt{4LsCe-(ReCe)^2}}{2LsCe}t + \right. \\ \left. \cos\dfrac{\sqrt{4LsCe-(ReCe)^2}}{2LsCe}t + E \right) \end{cases}$$

Where, Izft is a load-side equivalent current in the load characteristic power supply parameters at time t, Uzft is a load-side equivalent voltage in the characteristic power supply parameters at time t, Udf is a peak voltage of a load equivalent capacitor, Ls is a circuit cascading equivalent inductance, Re is an equivalent resistance of the load, Ce is an equivalent capacitance of the load, E is a resonant voltage of a power supply switching load, and exp is an exponential form of a natural constant e as a base.

This technical solution has the following beneficial effects: the output load detection sub-system comprises: the load characteristic detection branch system used for obtaining, by calculation, load characteristic power supply parameters of the output load through load characteristic power supply parameter detection;

The power supply parameter transmission branch system used for transmitting the load characteristic power supply parameters to an MCU on the load side; and the characteristic detection feedback branch system used for triggering a load start-stop signal and a load output power signal through the MCU on the load side, feeding a power supply demand signal back to the load balance regulation sub-system, and obtaining a load characteristic detection result, wherein the load characteristic power supply parameters at time t are calculated; where, Izft is a load-side equivalent current in the load characteristic power supply parameters at time t, Uzft is a load-side equivalent voltage in the characteristic power supply parameters at time t, Udf is a peak voltage of a load equivalent capacitor, Ls is a circuit cascading equivalent inductance, Re is an equivalent resistance of the load, Ce is an equivalent capacitance of the load, E is a resonant voltage of a power supply switching load, and exp is an exponential form of a natural constant e as a base; and by calculating the load-side equivalent current and the load-side equivalent voltage in the load characteristic power supply parameters, the load characteristic power supply parameters of the output load are closer to actual power supply values.

In one embodiment, the load balance regulation sub-system comprises:

A feedback receiving and converting branch system used for receiving the load characteristic detection result of the output load detection sub-system and converting the load characteristic detection result into a regulation signal;

A balance regulation start branch system used for starting the balance regulation module according to the regulation signal; and A demand parameter regulation branch system used for regulating load power supply through the balance regulation module, outputting regulation demand parameters, and obtaining the load balance demand parameters.

The operating principle of this technical solution is as follows: the load balance regulation sub-system comprises: the feedback receiving and converting branch system used for receiving the load characteristic detection result of the output load detection sub-system and converting the load characteristic detection result into a regulation signal;

The balance regulation start branch system used for starting the balance regulation module according to the regulation signal; and the demand parameter regulation branch system used for regulating load power supply through the balance regulation module, outputting regulation demand parameters, and obtaining the load balance demand parameters.

This technical solution has the following beneficial effects: the load balance regulation sub-system comprises: the feedback receiving and converting branch system used for receiving the load characteristic detection result of the output load detection sub-system and converting the load characteristic detection result into a regulation signal;

The balance regulation start branch system used for starting the balance regulation module according to the regulation signal; and the demand parameter regulation branch system used for regulating load power supply through the balance regulation module, outputting regulation demand parameters, and obtaining the load balance demand parameters; and the voltage of the solar energy storage batteries is lower than the 36V safety voltage, so the problems of high BMS protection circuit cost and high risk of the low-voltage system caused by a high voltage are solved.

In one embodiment, the load low-voltage direct supply sub-system comprises:

A demand main-control feedback branch system used for feeding the load balance demand parameters of the solar power supply low-voltage safety system back to a main control chip, wherein when solar power is supplied for low-voltage safety lighting, a current generated by the solar panels enters the main controller and then charges the energy storage battery pack during charging, and a current from the energy storage battery pack enters the main controller and then discharges to the load during discharging; electric energy converted from the solar energy charges the energy storage battery pack through the main controller and is stored; the multiple groups of solar panels are connected in parallel or in series to form the solar panel array according to an overall power demand of the system;

A photoelectric array control branch system used for connecting the extensible solar panels in parallel or in series to form the solar panel array through the main control chip, wherein each of the extensible solar panels comprises squamous photovoltaic sheets, an extensible photovoltaic sheet attachment surface, an extensible surface outspread net and a light-sensitive outspread net control structure, the squamous photovoltaic sheets are attached to an upper side of the extensible photovoltaic sheet attachment surface, a lower side of the extensible photovoltaic sheet attachment surface is attached to the extensible surface outspread net, the light-sensitive outspread net control structure senses a light intensity to control the mesh diameter of the extensible surface outspread net so as to control the extensible photovoltaic sheet attachment surface to expand or contract to change the overlap degree and acceptance angle of illuminated layers of the squamous photovoltaic sheets; when the light intensity is high and the energy storage battery pack is fully charged, the electric energy converted from solar energy is greater than a set low-voltage direct supply maximum peak of a set low-voltage direct supply peak range, the light-sensitive outspread net control structure senses that the light intensity is too high and controls the mesh diameter of the extensible surface outspread net to become smaller, so as to control the extensible photovoltaic sheet attachment surface to contract, the overlap degree of the illuminated layers of the squamous photovoltaic sheets attached to the extensible photovoltaic sheet attachment surface is increased, the illuminated surface is shrunk, the acceptance angle is decreased, and the solar energy-to-electric energy conversion efficiency is reduced until the electric energy converted from the solar energy is not greater than the set low-voltage direct supply maximum peak and is within the set low-voltage direct supply peak range; when the light intensity is low, the electric energy converted from solar energy is lower than a set low-voltage direct supply minimum peak of the set low-voltage direct supply peak range, the light-sensitive outspread net control structure senses that the light intensity is too low and controls the mesh diameter of the extensible surface outspread net to become larger, so as to control the extensible photovoltaic sheet attachment surface to expand, the overlap degree of the illuminated layers of the squamous photovoltaic sheets attached to the extensible photovoltaic sheet attachment surface is decreased, the illuminated surface is enlarged, the acceptance angle is increased, and the solar energy-to-electric energy conversion efficiency is improved until the electric energy converted from the solar energy is not lower than the set low-voltage direct supply minimum peak and is within the set low-voltage direct supply peak range; and A balanced low-voltage direct supply branch system used for controlling an output balance and driving circuit to perform low-voltage direct supply on the load side, wherein the energy storage battery pack has over-charge protection, the voltage and current of the energy storage battery pack, series or parallel connection of the batteries, and a matching operating voltage and current of the main controller are determined according to the voltage and current of the system, and the power of the solar panels, the total power of the load, an expected lighting time, an expected battery life, and a local average sunlight intensity and duration determine the electric capacity of the energy storage battery pack.

The operating principle of this technical solution is as follows: the load low-voltage direct supply sub-system comprises: the demand main-control feedback branch system used for feeding the load balance demand parameters of the solar power supply low-voltage safety system back to the main control chip, wherein when solar power is supplied for low-voltage safety lighting, the current generated by the solar panels enters the main controller and then charges the energy storage battery pack during charging, and the current from the energy storage battery pack enters the main controller and then discharges to the load during discharging; electric energy converted from the solar energy charges the energy storage battery pack through the main controller and is stored; the multiple groups of solar panels are connected in parallel or in series to form the solar panel array according to the overall power demand of the system; the photoelectric array control branch system used for connecting the extensible solar panels in parallel or in series to form the solar panel array through the main control chip, wherein each of the extensible solar panels comprises the squamous photovoltaic sheets, the extensible photovoltaic sheet attachment surface, the extensible surface outspread net and the light-sensitive outspread net control structure, the squamous photovoltaic sheets are attached to the upper side of the extensible photovoltaic sheet attachment surface, the lower side of the extensible photovoltaic sheet attachment surface is attached to the extensible surface outspread net, the light-sensitive outspread net control structure senses the light intensity to control the mesh diameter of the extensible surface outspread net so as to control the extensible photovoltaic sheet attachment surface to expand or contract to change the overlap degree and acceptance angle of illuminated layers of the squamous photovoltaic sheets; when the light intensity is high and the energy storage battery pack is fully charged, the electric energy converted from the solar energy is greater than the set low-voltage direct supply maximum peak of the set low-voltage direct supply peak range, the light-sensitive outspread net control structure senses that the light intensity is too high and controls the mesh diameter of the extensible surface outspread net to become smaller, so as to control the extensible photovoltaic sheet attachment surface to contract, the overlap degree of the illuminated layers of the squamous photovoltaic sheets attached to the extensible photovoltaic sheet attachment surface is increased, the illuminated surface is shrunk, the acceptance angle is decreased, and the solar energy-to-electric energy conversion efficiency is reduced until the electric energy converted from the solar energy is not greater than the set low-voltage direct supply maximum peak and is within the set low-voltage direct supply peak range; when the light intensity is low, the electric energy converted from the solar energy is lower than the set low-voltage direct supply minimum peak of the set low-voltage direct supply peak range, the light-sensitive outspread net control structure senses that the light intensity is too low and controls the mesh diameter of the extensible surface outspread net to become larger, so as to control the extensible photovoltaic sheet attachment surface to expand, the overlap degree of the illuminated layers of the squamous photovoltaic sheets attached to the extensible photovoltaic sheet attachment surface is decreased, the illuminated surface is enlarged, the acceptance angle is increased, and the solar energy-to-electric energy conversion efficiency is improved until the electric energy converted from the solar energy is not lower than the set low-voltage direct supply minimum peak and is within the set low-voltage direct supply peak range; and the balanced low-voltage direct supply branch system used for controlling the output balance and driving circuit to perform low-voltage direct supply on the load side, wherein the energy storage battery pack has over-charge protection, the voltage and current of the energy storage battery pack, the series or parallel connection of the batteries, and the matching operating voltage and current of the main controller are determined according to the voltage and current of the system, and the power of the solar panels, the total power of the load, the expected lighting time, the expected battery life, and the local average sunlight intensity and duration determine the electric capacity of the energy storage battery pack.

This technical solution has the following beneficial effects: the load low-voltage direct supply sub-system comprises: the demand main-control feedback branch system used for feeding the load balance demand parameters of the solar power supply low-voltage safety system back to the main control chip, wherein when solar power is supplied for low-voltage safety lighting, the current generated by the solar panels enters the main controller and then charges the energy storage battery pack during charging, and the current from the energy storage battery pack enters the main controller and then discharges to the load during discharging; electric energy converted from the solar energy charges the energy storage battery pack through the main controller and is stored; the multiple groups of solar panels are connected in parallel or in series to form the solar panel array according to the overall power demand of the system; the photoelectric array control branch system used for connecting the extensible solar panels in parallel or in series to form the solar panel array through the main control chip, wherein each of the extensible solar panels comprises the squamous photovoltaic sheets, the extensible photovoltaic sheet attachment surface, the extensible surface outspread net and the light-sensitive outspread net control structure, the squamous photovoltaic sheets are attached to the upper side of the extensible photovoltaic sheet attachment surface, the lower side of the extensible photovoltaic sheet attachment surface is attached to the extensible surface outspread net, the light-sensitive outspread net control structure senses the light intensity to control the mesh diameter of the extensible surface outspread net so as to control the extensible photovoltaic sheet attachment surface to expand or contract to change the overlap degree and acceptance angle of illuminated layers of the squamous photovoltaic sheets; when the light intensity is high and the energy storage battery pack is fully charged, the electric energy converted from the solar energy is greater than the set low-voltage direct supply maximum peak of the set low-voltage direct supply peak range, the light-sensitive outspread net control structure senses that the light intensity is too high and controls the mesh diameter of the extensible surface outspread net to become smaller, so as to control the extensible photovoltaic sheet attachment surface to contract, the overlap degree of the illuminated layers of the squamous photovoltaic sheets attached to the extensible photovoltaic sheet attachment surface is increased, the illuminated surface is shrunk, the acceptance angle is decreased, and the solar energy-to-electric energy conversion efficiency is reduced until the electric energy converted from the solar energy is not greater than the set low-voltage direct supply maximum peak and is within the set low-voltage direct supply peak range; when the light intensity is low, the electric energy converted from the solar energy is lower than the set low-voltage direct supply minimum peak of the set low-voltage direct supply peak range, the light-sensitive outspread net control structure senses that the light intensity is too low and controls the mesh diameter of the extensible surface outspread net to become larger, so as to control the extensible photovoltaic sheet attachment surface to expand, the overlap degree of the illuminated layers of the squamous photovoltaic sheets attached to the extensible photovoltaic sheet attachment surface is decreased, the illuminated surface is enlarged, the acceptance angle is increased, and the solar energy-to-electric energy conversion efficiency is improved until the electric energy converted from the solar energy is not lower than the set low-voltage direct supply minimum peak and is within the set low-voltage direct supply peak range; and the balanced low-voltage direct supply branch system used for controlling the output balance and driving circuit to perform low-voltage direct supply on the load side, wherein the energy storage battery pack has over-charge protection, the voltage and current of the energy storage battery pack, the series or parallel connection of the batteries, and the matching operating voltage and current of the main controller are determined according to the voltage and current of the system, and the power of the solar panels, the total power of the load, the expected lighting time, the expected battery life, and the local average sunlight intensity and duration determine the electric capacity of the energy storage battery pack; and the low-voltage direct supply system can discharge without increasing the voltage, thus being suitable for low-voltage direct supply load devices, high in effective power, and high in line safety; and the mains voltage is converted into a safety voltage corresponding to the energy storage batteries, power supply is switched when needed, and the efficiency of mains power supply will not be reduced.

Although the implementation solutions of the invention have been disclosed above, the invention is limited to the applications listed in the specification and embodiments and can also be applied to various suitable fields. Any skilled in the art can make other modifications easily, so the invention should not be limited to the specific details and embodiments illustrated and described here without departing from the claims and general concepts defined by equivalent ranges.

What is claimed is:

1. A low-voltage direct supply system capable of switching between solar energy and mains supply, comprising:
    a solar and stable-voltage energy storage branch system used for providing solar power supply and charging through multiple groups of extensible solar panels and an energy storage battery pack;
    a mains power supply stable-switching branch system used for quickly switching to mains power supply without shocks through a mains supply conversion module and charging the energy storage battery pack;
    a power supply load detection and control branch system used for detecting a voltage, a charge/discharge current, and a balance between supply and demand of the energy storage battery pack and performing switching control on branch systems; and
    an output balance and low-voltage direct supply branch system used for performing balanced low-voltage direct supply on a load side according to a control output signal of the power supply load detection and control branch system, wherein:
    the output balance and low-voltage direct supply branch system comprises:
    an output load detection sub-system used for detecting load characteristics of an output load to obtain a load characteristic detection result;
    a load balance regulation sub-system used for regulating load power supply through a balance regulation module according to the load characteristic detection result to obtain load balance demand parameters; and
    a load low-voltage direct supply sub-system used for connecting the extensible solar panels in parallel or in series to form a solar panel array according to the load balance demand parameters of a solar power supply low-voltage safety system, and controlling an output balance to perform low-voltage direct supply on the load side;
    the load low-voltage direct supply sub-system comprises:
    a demand main-control feedback branch system used for feeding the load balance demand parameters of the solar power supply low-voltage safety system back to a main control chip, wherein when solar power is supplied for low-voltage safety lighting, a current generated by the solar panels enters a main controller and then charges the energy storage battery pack during charging, and a current from the energy storage battery pack enters the main controller and then discharges to a load during discharging; electric energy converted from the solar energy charges the energy storage battery pack through the main controller and is stored; the multiple groups of solar panels are connected in parallel or in series to form the solar panel array according to an overall power demand of the system;
    a photoelectric array control branch system used for connecting the extensible solar panels in parallel or in series to form the solar panel array through the main control chip, wherein each of the extensible solar panels comprises squamous photovoltaic sheets, an extensible photovoltaic sheet attachment surface, an extensible surface outspread net and a light-sensitive outspread net control structure, the squamous photovoltaic sheets are attached to an upper side of the extensible photovoltaic sheet attachment surface, a lower side of the extensible photovoltaic sheet attachment surface is attached to the extensible surface outspread net, the light-sensitive outspread net control structure senses a light intensity to control a mesh diameter of the extensible surface outspread net so as to control the extensible photovoltaic sheet attachment surface to expand or contract to change an overlap degree and acceptance angle of illuminated layers of the squamous photovoltaic sheets; when the light intensity is high and the energy storage battery pack is fully charged, the electric energy converted from the solar energy is greater than a set low-voltage direct supply maximum peak of a set low-voltage direct supply peak range, the light-sensitive outspread net control structure senses that the light intensity is too high and controls the mesh diameter of the extensible surface outspread net to become smaller, so as to control the extensible photovoltaic sheet attachment surface to contract, the overlap degree of the illuminated layers of the squamous photovoltaic sheets attached to the extensible photovoltaic sheet attachment surface is increased, an illuminated surface is shrunk, the acceptance angle is decreased, and solar energy-to-electric energy conversion efficiency is reduced until the electric energy converted from the solar energy is not greater than the set low-voltage direct supply maximum peak and is within the set low-voltage direct supply peak range; when the light intensity is low, the electric energy converted from solar energy is lower than a set low-voltage direct supply minimum peak of the set low-voltage direct supply peak range, the light-sensitive outspread net control structure senses that the light intensity is too low and controls the mesh diameter of the extensible surface outspread net to become larger, so as to control the extensible photovoltaic sheet attachment surface to expand, the overlap degree of the illuminated layers of the squamous photovoltaic sheets attached to the extensible photovoltaic sheet attachment surface is decreased, the illuminated surface is enlarged, the acceptance angle is increased, and the solar energy-to-electric energy conversion efficiency is improved until the electric energy converted from the solar energy is not lower than the set low-voltage direct supply minimum peak and is within the set low-voltage direct supply peak range; and a balanced low-voltage direct supply branch system used for controlling an output balance and driving circuit to perform low-voltage direct supply on the load side, wherein the energy storage battery pack has overcharge protection, the voltage and current of the energy storage battery pack, series or parallel connection of batteries, and a matching operating voltage and current of the main controller are determined according to a voltage and current of the system, and power of the solar panels, total power of the load, an expected lighting time, an expected battery life, and a local average sunlight intensity and duration determine an electric capacity of the energy storage battery pack.

2. The low-voltage direct supply system capable of switching between solar energy and mains supply according to claim 1, wherein the solar and stable-voltage energy storage branch system comprises:
 an extensible solar panel sub-system used for performing variable solar power supply through the multiple groups of extensible solar panels;
 an energy storage battery pack allocation sub-system used for storing surplus electric energy through a centralized energy storage battery pack when photoelectric power is sufficient, and supplying power to the load when the photoelectric power is insufficient; and
 a charge/discharge connecting and switching sub-system used for connecting the solar panels and the energy storage battery pack and switching between charging and discharging.

3. The low-voltage direct supply system capable of switching between solar energy and mains supply according to claim 1, wherein the mains power supply stable-switching branch system comprises:
 a mains supply switching start sub-system used for triggering a solar energy-to-mains supply start signal when photoelectric power is insufficient and electricity in the energy storage batteries is consumed to a set minimum value;
 a mains supply stable-switching sub-system used for quickly and stably switching to mains power supply when receiving the solar energy-to-mains supply start signal from the mains supply switching start sub-system; and
 a mains power supply and charging sub-system used for supplying power and charging the energy storage batteries through a mains supply when the mains supply stable-switching sub-system switches to the mains power supply.

4. The low-voltage direct supply system capable of switching between solar energy and mains supply according to claim 1, wherein the power supply load detection and control branch system comprises:
 a photo-electricity and energy storage detection and control sub-system used for detecting the voltage, the charge/discharge current, and the balance between supply and demand of the energy storage battery pack through voltage detection, current detection and power supply load balance detection;
 a mains supply port input-output sub-system used for being externally connected to a mains supply and externally connected to an output switch through a mains supply module input port; and
 a main control chip operation control sub-system used for performing output photoelectric control, charge/discharge control, parameter calculation and battery capacity calculation, and controlling over-current protection start-stop, mains supply module start-stop, or output switch on-off.

5. The low-voltage direct supply system capable of switching between solar energy and mains supply according to claim 4, wherein the photo-electricity and energy storage detection and control sub-system comprises:
 a photo-electricity and energy storage pack detection branch system used for detecting the solar panels, as well as the voltage and charge/discharge current of the batteries to obtain photo-electricity and energy storage pack detection data;
 a photoelectric charging circuit control branch system used for controlling a photoelectric charging circuit according to the photo-electricity and energy storage pack detection data; and
 a solar panel control branch system used for controlling extension and series/parallel connection of the solar panels according to a control signal.

6. The low-voltage direct supply system capable of switching between solar energy and mains supply according to claim 4, wherein the main control chip operation control sub-system comprises:
 a main control logic operation branch system used for outputting photoelectric control logic, charge/discharge control logic, parameter calculation and battery capacity calculation to obtain main control logic operation information;
 a main control chip control branch system used for performing main control system control during a solar energy and mains supply switching process and a stable power supply process according to the main control logic operation information to obtain a main control system control signal; and a main control system execution branch system used for executing load side protection, energy storage battery protection, circuit device protection, mains supply module start-stop and output switch control according to the main control system control signal, and performing power regulation, communication and protection through the main controller, which specifically comprises: over-charge protection implemented by limiting a charge voltage to stop charging when it is detected that the voltage of the energy storage battery pack reaches a charging cut-off voltage, over-discharge protection implemented by automatically stopping an output by the main controller to protect the energy storage battery pack against damage when the voltage of the energy storage battery pack is lower than a protection voltage and automatically resuming power supply when the energy storage battery pack is recharged, and load over-current and short-circuit protection implemented by automatically cutting off a load output by the main controller when a load current exceeds a rated current of the main controller or the load is short-circuited; the main controller is used for over-voltage protection control, reverse charge protection control, and lightning protection control; power of the main controller is selected according to power of a total load withstood by the system, and the rated current of the main controller determines a maximum operating current of the load; a port of the main controller comprises wires connected to the following components: a set of positive and negative wires connected to the solar panels, a set of positive and negative wires connected to the energy storage battery pack, and a set of positive and negative wires connected to the load output; an operating voltage of a low-voltage controller of the system is 12V or 24V; the main controller is also used for determining whether it is daytime or nighttime according to the intensity of a charging current, and performing automatic charging in daytime and automatic discharging in nighttime to automatically turn on a lamp in nighttime and turn off the lamp in daytime; the voltage of the energy storage battery pack is detected through a voltage analog detection module; and the voltage analog detection module comprises: an energy storage battery pack analog output terminal, a voltage detection unit, a PWB modulation circuit, an analog load and an adjustable load circuit, and the adjustable load circuit is electrically connected to the energy storage battery pack analog output terminal; a current of the adjustable load circuit is in direct proportion to an output current of the PWB modulation circuit; an output voltage of the PWB modulation circuit is in direct proportion to a voltage of the energy storage battery pack analog output terminal; the output switch is disposed on a circuit between the PWB modulation circuit and the voltage detection unit, a movable contact of the output switch is electrically connected to an output voltage external control signal terminal of the PWB modulation circuit, and one static contact of the output switch is electrically connected to the voltage detection unit; and the voltage of the energy storage battery pack is reflected by a detection result of the voltage detection unit.

7. The low-voltage direct supply system capable of switching between solar energy and mains supply according to claim 1, wherein the output load detection sub-system comprises:

a load characteristic detection branch system used for obtaining, by calculation, load characteristic power supply parameters of the output load through load characteristic power supply parameter detection;

a power supply parameter transmission branch system used for transmitting the load characteristic power supply parameters to an MCU on the load side; and a characteristic detection feedback branch system used for triggering a load start-stop signal and a load output power signal through the MCU on the load side, feeding a power supply demand signal back to the load balance regulation sub-system, and obtaining a load characteristic detection result.

8. The low-voltage direct supply system capable of switching between solar energy and mains supply according to claim 1, wherein the load balance regulation sub-system comprises:

a feedback receiving and converting branch system used for receiving the load characteristic detection result of the output load detection sub-system and converting the load characteristic detection result into a regulation signal;

a balance regulation start branch system used for starting the balance regulation module according to the regulation signal; and a demand parameter regulation branch system used for regulating load power supply through the balance regulation module, outputting regulation demand parameters, and obtaining the load balance demand parameters.

* * * * *